United States Patent Office 2,934,363
Patented Apr. 26, 1960

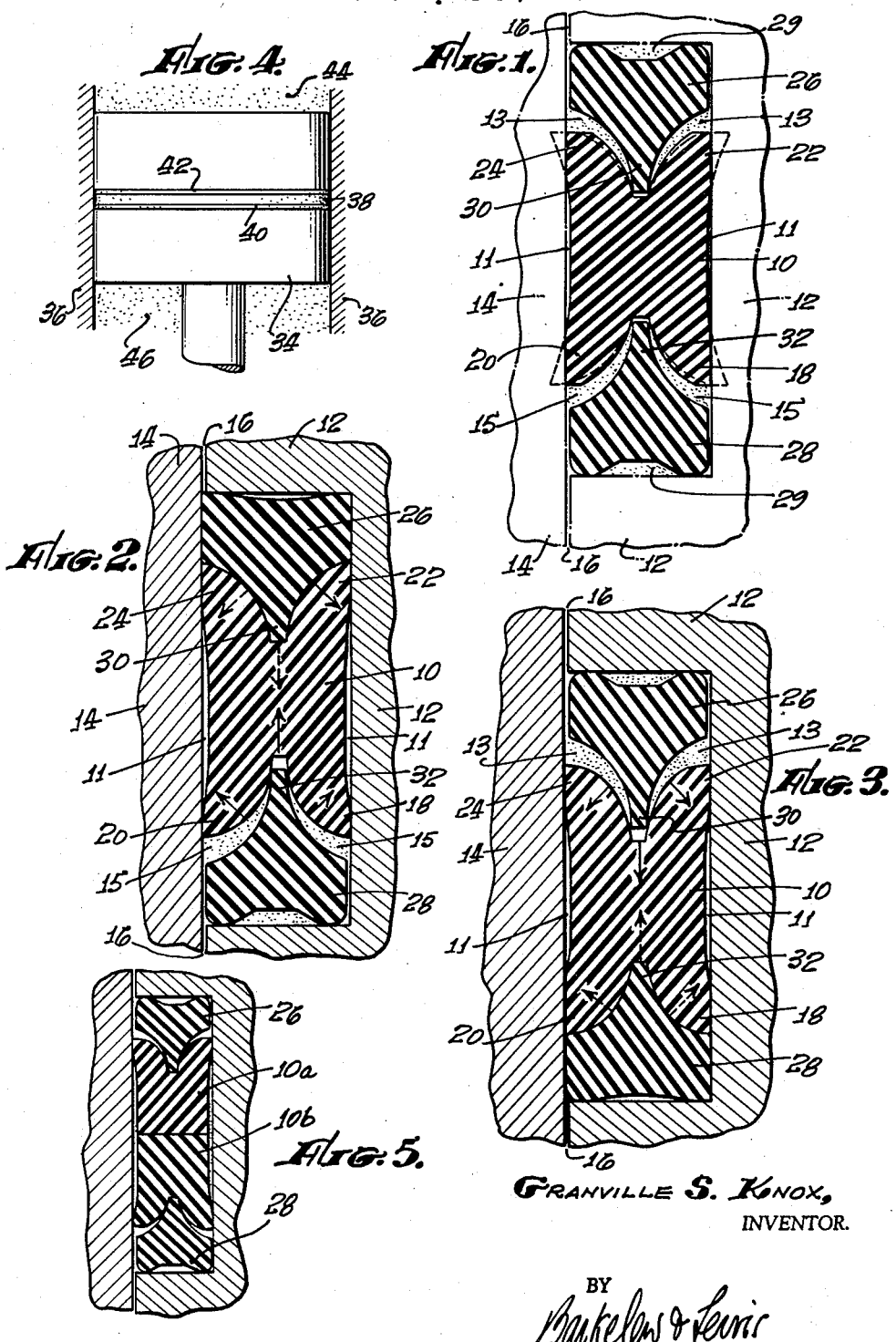

2,934,363

PACKING SEAL

Granville S. Knox, Glendale, Calif., assignor to Hydril Company, Los Angeles, Calif., a corporation of Ohio Application April 14, 1958, Serial No. 728,213

11 Claims. (Cl. 286—26)

This invention relates to a packing seal useful in sealing a clearance between two surfaces against fluid flow in either direction across the seal. The invention is characterized by the combination of a double U-type seal with novel means protecting the lips of the seal from damage. The invention is particularly useful in applications involving high fluid pressures, where ordinary single U-type seals are often quickly destroyed, or damaged to the extent that they no longer effectively seal, by an extrusion of the sealing lip into the clearance due to the pressure differential across the seal.

U-type seals, which are used to seal a clearance between two surfaces, are named for a generally U-shaped cross-sectional configuration produced by a channel or depression formed in one end of the seal. The depression extends below two sealing lips, one sealing lip bearing on one of the surfaces, the other sealing lip bearing on the bottom of a groove cut in the other surface, with the depression in communication with fluid contained in the clearance between the two surfaces. When the pressure of the fluid in the clearance increases, the increase in pressure is communicated into the depression, developing forces which press the sealing lips onto their respective surfaces. A single U-type seal has one such depression or channel, the opposite flat side of the seal being adapted to bear on one side of the groove to limit axial movement of the seal in response to fluid pressure. A single U-type seal is suitable only for sealing against pressure applied on the one channeled side. In applications where sealing is required against pressure from either side, two, single U-type seals, installed in separate grooves in back-to-back relation with each other, are commonly used.

Two single U-type seals, installed in back-to-back relation in separate grooves, have been fairly effective for sealing the clearance between two surfaces against flow in either direction. However, it has been found that occasionally one seal may very quickly fail when the assembly is exposed to high differential pressures. The cause of this failure is due to an extrusion of one of the sealing lips on the low pressure side into the clearance between the surfaces, and a subsequent degradation in the sealing ability of the lip. When the seal is made of two single U-type seals positioned back-to-back in different grooves, the seal on the high pressure side is supported mechanically at its back by the side of its groove, but since the volume between the backs of the two seals may be filled with leakage fluid, the high pressure is transmitted to the back of the seal on the low pressure side, either through leakage around the seal on the high pressure side, or through an extrusion of the back of the seal on the high pressure side into the clearance extending between the two seals, which is completely filled with fluid before such extrusion. A force is thus developed upon the back side of the seal which presses the lips of that seal against the low pressure side of its groove and thereby distorting the lips in such a manner that they bridge and seal the clearance on the low pressure side. The seal will then hold even the highest of fluid pressures applied against its back side and one lip may, under these conditions, be extruded into the clearance and badly damaged.

In accordance with this invention, a novel means has been devised to protect the sealing lips of U-type seals against damage due to extrusion, which means does not interfere with the normal sealing action of the sealing lips, but which prevents extrusion of either into its adjacent clearance. The invention further comprises a double U-type seal for positioning within a groove between two deformable members fully protecting all portions of the seal from pressural extrusion into adjacent clearances.

Broadly described, the invention comprises two U-type seals in back-to-back relation, or, preferably, a single member with U-formations in that relation, together with two deformable plugging members between the two U-formations and the end walls of the single groove in which the seals and plugs are installed. The deformable plugs fit between the groove bottom and the opposing surface, preferably with some clearance when under no pressure. Pressure applied to either U-formation causes the seal to exert pressure against the plug associated with the other U-formation, compressing it longitudinally and expanding it laterally. That lateral expansion closes the clearance at that end of the seal, preventing the lip at that end of the seal from being extruded into the clearance.

These plugging members have no adverse effect on the seal, because the member on the high pressure sides does not receive a deforming force, and due to its clearance cannot affect the transmission of pressure to the depression on the high pressure side of the seal. The member on the low pressure side is deformed to bear on its bounding surfaces and it does not detract from the sealing action.

In addition to protecting the sealing lips without adversely affecting the sealing action, the double seal and plugging members make another contribution to the sealing action by pressing the lips on the low pressure side of the seal against their bearing surfaces, thus forming a secondary seal against any fluid leaked around the lips of the high pressure side. There is also a tendency to trap a small amount of pressure fluid between the lips to thus provide better lubrication for the seal with a reduction in the sliding friction and rate of wear. (See space 11, Figs. 1, 2 and 3.)

These and other advantages of the invention will be understood more clearly from the following description of an illustrative embodiment thereof, in connection with the attached drawings, in which:

Fig. 1 is a schematic section of a preferred embodiment of the invention, with equal pressure or no pressure at both sides of the seal;

Fig. 2 is a section of the device of Fig. 1 with a greater pressure applied to the lower side of the seal;

Fig. 3 is a section of the device of Fig. 1 with a greater pressure applied to the top of the seal;

Fig. 4 is an elevation of the device of Fig. 1 used in connection with a cylinder and double acting piston; and Fig. 5 is a section of a modification of the device of Fig. 1.

Referring to Fig. 1, the invention is used in combination with two members 12 and 14 having opposing surfaces separated by a clearance 16 and adapted to receive a pressure fluid in the clearance. The members may, for example, be a cylinder and a movable piston, or a cylinder and a stationary piston, or any other members which are separated by a clearance and adapted to receive fluid in the clearance. The invention may be employed in any structure of that general class, and its operation will be substantially the same regardless of the specific structure as for instance 12 could be a stationary cylinder and 14 a sliding plunger. However, for convenience of explanation it will be assumed here that member 12 is a movable piston and member 14 is a cylinder.

The invention comprises a groove cut into one of the members, a double U-type seal 10 within the groove, and two plugging members 26 and 28 within the groove between the seal 10 and the end walls of the groove. The groove is shown cut into the piston 12 for illustration only, since in many cases it would be possible and perhaps preferable to cut the groove into the cylinder. However, the factors involved in choosing the location of the groove are not material to the operation of the invention, and so will not be discussed herein. The seal 10 has sealing lips 22 and 24 at one side (upper in the drawings) and sealing lips 18 and 20 at its lower side, with a depression or channel between each pair of lips. The seal 10 is made of resilient material with the distance between the outer edges of the lip pairs normally greater than the distance from the bottom of the groove to the opposing surface. The dotted lines on Fig. 1 show the shape seal 10 would assume if it were not constrained between members 12 and 14. This flaring of the lips functions to provide a small amount of force pressing the lips to their bearing surfaces in the absence of any fluid forces. The radial width of seal 10 in its central portion is preferably made smaller than the distance from the bottom of the groove to the opposing surface, to facilitate insertion of the piston 12 with its seal 10 into the cylinder 11. Clearance in the central portion is not essential to the operation of the seal, but it is convenient, and most U-type seals are made in that way. It should be noted, however, that the central clearance should not extend significantly beyond the bottoms of the two depressions, to avoid reducing the sealing lip area, which extends from the end of the lips to the bottom of the depression. Plugging members 26 and 28 with ridges or extensions 30 and 32 are interposed between the sides of seal 10 and the adjacent groove walls with their extensions projecting into the adjacent depressions of the seal. These members, like the seal 10, are also made of resilient material, but generally not of identical hardness with the material of seal 10. The factors involved in choosing material for members 26, 28, and seal 10, are discussed in the closing paragraphs of this document. Plugging members 26 and 28 preferably fit normally with clearance between the bottom of the groove and the opposing surface. They also are preferably fitted snugly between the seal 10 and the adjacent groove wall and preferably have depressions 29 in the face bearing on the wall. The latter two features enhance the operation of the invention, although they are not essential parts thereof.

Fluid as shown at 13 is communicated through one side of the clearance 16 into the space surrounding member 26 from a source not shown. Fluid as shown at 15 is communicated through the other side of the clearance 16 into the space surrounding member 28 from a second source not shown. Fluid leakage from the two sources will normally fill the spaces 11. Generally the two sources of fluid pressure are distinct, but operably related to one another. This, however, is a property of the device with which the invention is used, and has no significant bearing on the invention. The fluid may be oil, or water, or air, or any other fluid. The character of the fluid is also a property of the machine rather than the invention; but it does have a bearing on some of the minor features of the invention, such as the choice of resilient material, as is discussed in the closing paragraphs of this document. The fluid is usually the same on both sides of the seal, but this is not essential. The invention will function with two different fluids; as, for example, water and air. The fluid is generally subject to a differential of pressure along the clearance 16 due to the action of the machine, either in one direction across the seal, or alternating from one direction to the other. The embodiment disclosed in Figs. 1, 2, and 3, is adapted to operate with an alternating pressure differential. Fig. 1 shows the invention with equal pressure at both sides of the seal, Fig. 2 shows the pressure as greater on the lower side. The solid-line force vectors indicate forces applied on seal 10 by the fluid, and the dotted-line force vectors indicate forces applied on the seal 10 by the adjacent plugging member.

In explaining the operation of the invention it will be convenient to assume both sides of the seal filled with fluid at zero pressure. The parts are related as shown in Fig. 1. Suppose a pressure is applied to fluid 15, while fluid 13 remains at zero pressure. As shown in Fig. 2, pressure of fluid 15 develops forces pressing lips 18 and 20 against their bearing surfaces, indicated by the diagonal solid-line force vectors, and forces tending to move seal 10 upward, indicated by the solid-line vertical force vector. Seal 10 moves upward in response to the upward force, pressing on the extension 30 of plugging member 26, deforming it into the shape shown, such that it completely fills the clearance between the groove bottom and opposing wall and seals off the clearance 16, thus preventing lip 24 from being pressed into the clearance. When the plugging member is deformed far enough its surface contacts the edges of lips 22 and 24 and exerts a force on them, indicated by the dotted-line diagonal force vectors, which presses them against their bearing surfaces, and forms a secondary seal against any fluid that leaks around the primary seal formed by lips 20 and 18. Due to the fact that extension 30 is normally longer in the axial direction (vertically in the figures) than the corresponding depth of the depression between lips 22 and 24 (see Fig. 1) the body 26 of the plugging member is expanded by the upward pressure on its extension to close off the clearance at 16 before lip 24 extrudes into that clearance or the clearance around the plug. Consequently, in the condition of Fig. 2, sealing lip 24 cannot enter any clearance. And that relation in depths of extension and depression, and also the normal clearance between the lip edges and the plug extension (Fig. 1) allow ready entry of pressure fluid under and between lips 18 and 20 (Fig. 2) to force member 10 up. And the fact that the plug members in their normal unexpanded condition preferably do not fit tightly between the groove bottom and the opposing surface, also facilitates that pressure fluid entry.

It is evident that lip 24 cannot enter clearance 16, and so cannot receive damage by being extruded thereinto. If the pressure of fluid 15 becomes great enough, the corner of plugging member 26 may extrude somewhat into clearance 16 but this will not affect the sealing ability of the invention because plugging member 26 makes no positive contribution to the seal. Until damage to plugging member 26 becomes so extensive that it will no longer close the space between lip 24 and clearance 16, the operation of the device will not be materially affected. Furthermore, since plugging member 26 is not involved positively in the sealing action, it is possible to make it of a harder material than is used in the seal 10, thus reducing the extent of any possible damage.

The reaction of the device in response to a high pressure on fluid 13 is shown in Fig. 3. Except for the obvious transposition of function there is no significant difference between this action and the action discussed above in connection with Fig. 2.

The application of the invention to a characteristic type of machine is illustrated in Fig. 4, which shows in elevation a double acting piston 34 contained with clearance within a cylinder 36 with a fluid 44 above the piston and a fluid 46 below the piston. Structure of this type is commonly found in double acting pumps. In accordance with the invention this structure has an annular groove cut in the piston, which contains an annular double U-type seal 38 and annular plugging members 40 and 42 between the seal 38 and the sides of the groove. A section taken through the seal would be essentially similar to Figs. 1, 2 and 3, and the reaction of members 38, 40, and 42, to pressure differentials between fluids 44 and 46 is functionally identical to the reaction described for members 10, 28 and 26. In the assembly of this device the seal 38 and plugging members 42 and 40 are inserted in their groove before the piston is inserted in the cylinder. This is done by stretching the members, which are made of resilient material, over the end of the piston and sliding them down until they seat in the groove. The piston is then inserted into the cylinder.

Fig. 5 shows a modification in which the seal member is made up of two parts 10a and 10b placed back-to-back and, with the plugs 26 and 28, located in a single groove. The functions are the same as described for the other figures. The seal or sealing strip, as those terms are used in the appended claims, may thus be made up of a plurality of pieces.

The exact dimensions and properties of the invention cannot be specified except in reference to a specific machine or application, since they depend upon properties associated with the machine, such as the amount of clearance, type of fluid, fluid pressure, and the like. But the specific dimensions and properties required for any given application will be apparent to those skilled in the art, since the design of U-type seals to fit any application is well understood. It may, however, be helpful to append a brief discussion of some of the general engineering considerations involved.

The groove may be located in either member, the choice depending primarily on relative movement between the parts and on assembly and repair factors. If one surface is significantly smaller than the other and is adapted to move a relatively large distance, the groove must be cut into the smaller surface to prevent the smaller surface from moving out of contact with the sealing lips. And since the members must be placed in the groove before assembly, and removed from the groove to be replaced, it is preferable to cut the groove into the member which goes into the assembly later, or which is more conveniently removable.

The material used in the plugging members depends, of course, on the chemical nature of the fluid and the differential pressures involved. However, it is usually possible to use the same type of material as is used in the double U-seal, but preferably with a greater hardness to resist damage by extrusion. In one embodiment of the invention, which contacted water at 70° F. on both sides of the seal and was subject to differential pressures of 18,000 p.s.i. in either direction across the seal, the U-seal was made of Buna N rubber material having a Shore hardness of 68–72, and both plugging members were made of the same material having a Shore hardness of 86–90. The plugging members are also preferably fitted with small clearance between the double U-seal and the groove side, and preferably have a concave depression in the surface contacting the groove side. These latter two features are not essential, but they enhance the operation of the invention by making the plugging action more sensitive with respect to pressure differential. The shape of the extension is preferably chosen to approximately match the shape of depression of the U-seal to improve secondary sealing action, and so will depend on the particular type of U-seal employed. Matching of the shapes is not essential, but does serve to improve secondary sealing and to make the assembly more compact. It is essential, however, that there be some clearance between the plugging members and the wall of the opposing surface, so that fluid pressure can be communicated to the depression of the U-seal without pressing the plugging member against the U-seal. In this disclosure the clearance is shown approximately equal to the clearance between the surfaces, and, although the size of the clearance is not critical, it is preferably kept small to keep the plugging action sensitive with respect to differential pressure. The invention will operate with a large clearance between the deformable member and the opposing surface, but it will require a large differential of pressure to close off the clearance.

Thus it can be seen that while this invention has been illustrated by reference to one specific embodiment thereof, many modifications are possible which do not depart from the spirit of the invention. This invention includes all such modifications which fall within the scope of the following claims.

I claim:

1. In a device including two members with surfaces formed thereon, the members positioned with their surfaces in mutual opposing relation to each other with clearance therebetween, and said device adapted to contain a fluid within the clearance: a packing seal means for sealing off said clearance against fluid flow, said packing seal means comprising in combination a groove cut into the surface portion of one of the members, a sealing strip within the groove adapted to bear on the bottom of the groove and on the opposing surface, the sealing strip having two depressions in its cross-sectional shape, said depressions formed between two laterally flaring extension lips in the sides of the sealing strip facing toward the sides of the groove, a first and a second plugging strip within the groove one at each side of the sealing strip between the sealing strip and the respective side of the groove, each of the plugging strips having a body adapted to bear on the bottom of the groove and said opposing surface and an extension projecting from the body into the adjacent depression between the lips of the sealing strip, said extensions having depth dimensions greater than the depth dimensions of the sealing strip depressions, the lips at either side of the sealing member being laterally expansible, by fluid pressure exerted on that side, to bear against the groove bottom and said opposing surface, and the body of the plugging strip at the opposite side being laterally expansible by a force applied from the sealing strip to its extension to bear simultaneously on the bottom of the groove and the opposing surface and the adjacent side wall of the groove.

2. A packing seal means as defined in claim 1, wherein said plugging strips are made of resilient material, and each plugging strip has a depression in its cross-sectional shape formed in the side of the strip facing the adjacent side of the groove.

3. A packing seal means as defined in claim 1 and in which there is normal clearance between each plugging strip extension and the edges of the adjacent sealing strip lips to allow entry of pressure fluid between the plug and lips.

4. A packing seal means as defined in claim 1, and in which the plugging strips in their normal unexpanded condition do not fit tightly between the groove bottom and the groove and the opposing surface.

5. A packing seal means as defined in claim 1, wherein said sealing strip is made of rubber-like material and wherein the pairs of flared lips flanking each depression are directed toward the adjacent side of the groove, the distance between the outer edges of the lips of each pair being normally greater than the distance between the bottom of the groove and the opposing surface, each pair of lips being constrained between the bottom surface of the groove and the opposing surface, with each lip bearing on its adjacent surface and exerting a force thereon.

6. A packing seal means as defined in claim 5, wherein said plugging strips are made of rubber-like material of greater hardness than the resilient material forming the sealing annulus.

7. A packing seal means as defined in claim 6, wherein said plugging strips each have a concave depression in its cross-sectional shape formed in the side of the strip facing the side of its adjacent groove.

8. A sealing assembly comprising a central sealing member and two plugging members at opposing sides of the sealing member, the sealing member having a cross-sectional shape with two depressions therein, the plugging members each having a cross-sectional shape with an extension thereon, the extension of each plugging member extending into one of the depressions of the sealing member, both plugging members deformable by force exerted on their extensions, and wherein each plugging member has a depression in its cross-sectional shape in the side thereof opposing said extension therein.

9. A sealing assembly comprising in combination a central annular sealing member and two annular and radially expansible plugging members at axially opposite sides of the sealing member, the sealing member having a cross-sectional form comprising an axially extending central portion with pairs of radially flared resilient lips on axially opposite sides of the central portion with a depression between each pair of lips, the plugging members each having a cross-sectional form comprising a base portion and an axial extension thereon greater in axial dimension than the axial depth of the adjacent sealing member depression, the extension of each plugging member extending into one of said depressions, and the base portions of both plugging members being radially expansible by an axial force exerted on their extensions by the central portion of the sealing member.

10. The combination defined in claim 9 and in which there is normal radial clearance between the edges of said lips and the extension of the adjacent plugging member.

11. The combination defined in claim 9 and in which the sealing member and both plugging members are composed of rubber-like material.

References Cited in the file of this patent

UNITED STATES PATENTS

| | | |
|---|---|---|
| 2,075,947 | Kennedy | Apr. 6, 1937 |
| 2,417,828 | Joy | Mar. 25, 1947 |
| 2,658,809 | Schultz | Nov. 10, 1953 |
| 2,760,794 | Hartranft | Aug. 28, 1956 |
| 2,815,970 | Wallace | Dec. 10, 1957 |
| 2,827,314 | Gransberg et al. | Mar. 18, 1958 |
| 2,841,429 | McCuistion | July 1, 1958 |